(12) United States Patent
Komatsu

(10) Patent No.: US 6,351,462 B1
(45) Date of Patent: Feb. 26, 2002

(54) CDMA RECEIVING APPARATUS AND METHOD THEREFOR

(75) Inventor: Masahiro Komatsu, Tokyo (JP)

(73) Assignee: NEC Corporation (JP)

(*) Notice: Subject to any disclaimer, the term of this patent is extended or adjusted under 35 U.S.C. 154(b) by 0 days.

(21) Appl. No.: 09/164,699

(22) Filed: Oct. 1, 1998

(30) Foreign Application Priority Data

Oct. 1, 1997 (JP) .............................................. 9-269052

(51) Int. Cl.$^7$ .............................................. H04B 7/216
(52) U.S. Cl. ........................ 370/342; 370/441; 375/350; 375/148; 375/343
(58) Field of Search ................................ 370/335, 342, 370/479, 441; 375/232, 144, 148, 150, 130, 350, 340, 343

(56) References Cited

U.S. PATENT DOCUMENTS

| | | | | |
|---|---|---|---|---|
| 5,353,300 A | * | 10/1994 | Lee et al. ........................ | 375/1 |
| 5,353,306 A | * | 10/1994 | Yamamoto .................... | 375/14 |
| 5,572,552 A | * | 11/1996 | Dent et al. ................... | 375/434 |
| 5,610,939 A | * | 3/1997 | Takahashi et al. ........... | 375/206 |
| 5,809,058 A | * | 9/1998 | Sato ............................ | 375/200 |
| 5,818,882 A | * | 10/1998 | Komatsu ..................... | 375/344 |
| 5,844,935 A | * | 12/1998 | Shoji ........................... | 375/200 |
| 6,064,688 A | * | 5/2000 | Yanagi ........................ | 375/149 |
| 6,134,262 A | * | 10/2000 | Kitade et al. ................ | 375/142 |

FOREIGN PATENT DOCUMENTS

| | | |
|---|---|---|
| JP | 6141021 | 5/1994 |
| JP | 7170242 | 7/1995 |
| JP | 7170243 | 7/1995 |
| JP | 7177569 | 7/1995 |
| JP | 8056176 | 2/1996 |
| JP | 8065205 | 3/1996 |
| JP | 8065206 | 3/1996 |
| JP | 8116303 | 5/1996 |
| JP | 8163087 | 6/1996 |
| JP | 8186558 | 7/1996 |

OTHER PUBLICATIONS

Office Action Issued by the Japanese Patent Office on Nov. 17, 1998 and a Translation Thereof.
* Translation of Abstract.

* cited by examiner

Primary Examiner—Huy D. Vu
Assistant Examiner—Tri H. Phan
(74) Attorney, Agent, or Firm—Ostrolenk, Faber, Gerb & Soffen, LLP

(57) ABSTRACT

A CDMA receiving apparatus is newly provided with a profile calculator 107 for calculating a profile of a reception signal and a tap controller 108 for determining the number of needed taps and the timing from the profile. An adaptive despreading filter 110 for performing filter processing on a reception signal r, an autocorrelative inverse matrix calculator 113 and an adaptive controller 111 for controlling a filter coefficient of an adaptive despreading filter receive an instruction of the tap length and the timing from the tap controller 10 to calculate only the tap position determined.

9 Claims, 5 Drawing Sheets

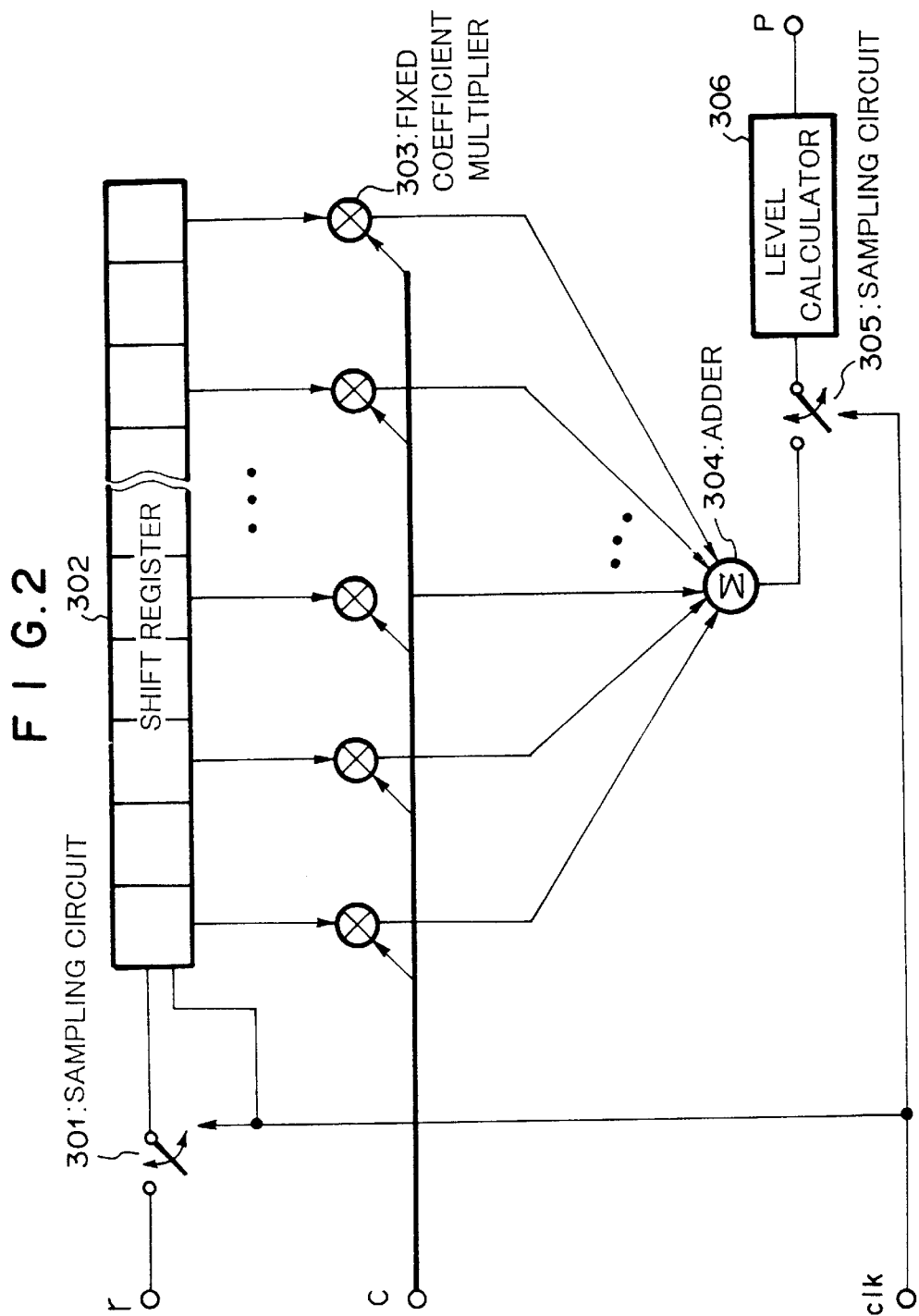

F I G. 3A
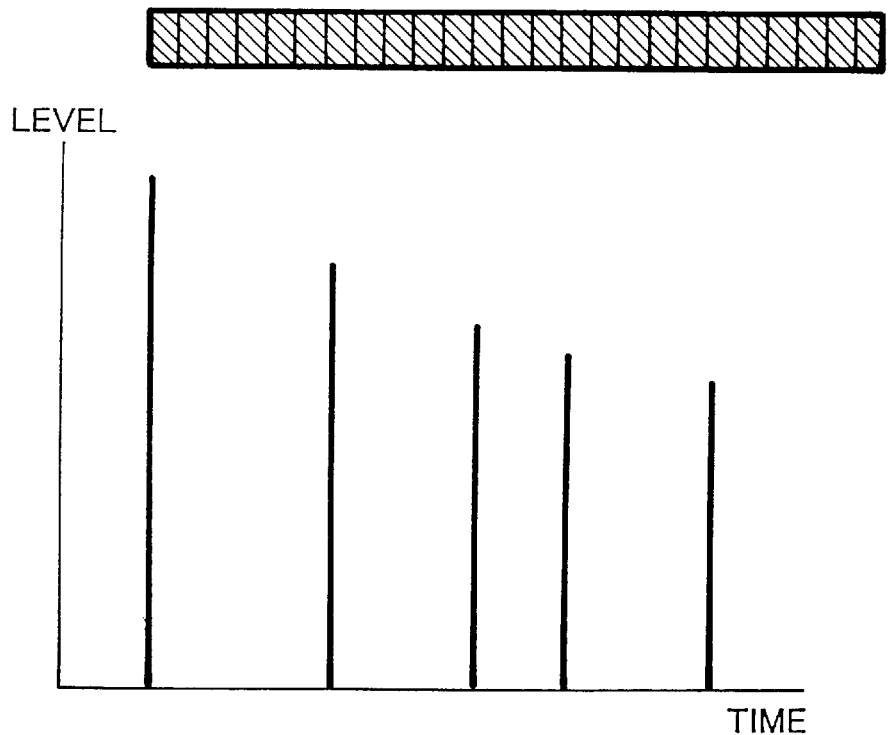
F I G. 3B
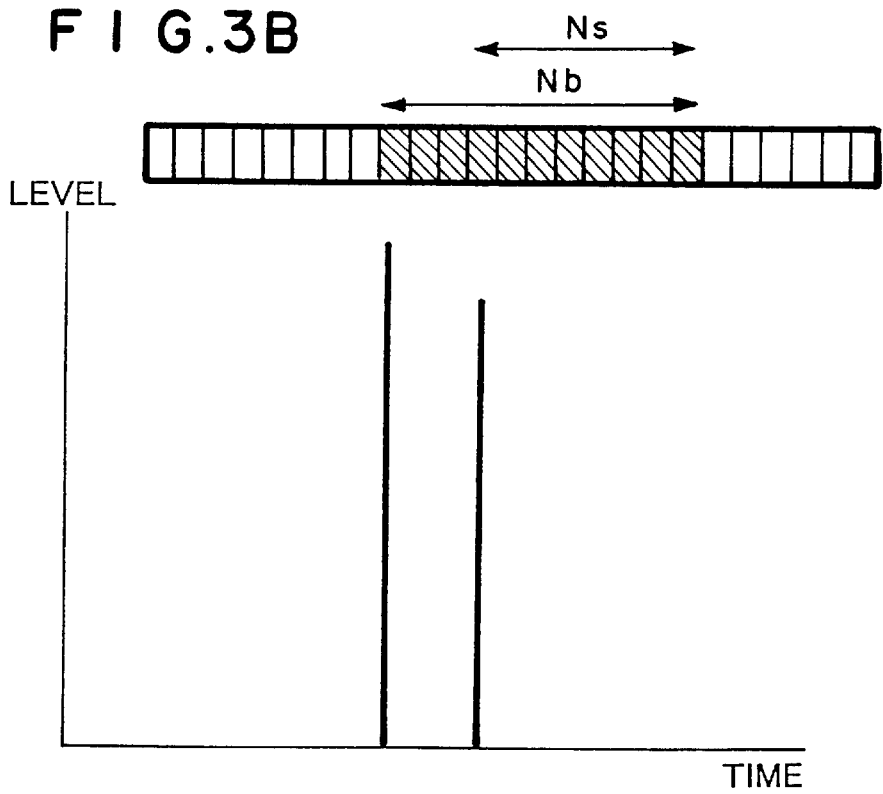

CDMA RECEIVING APPARATUS AND METHOD THEREFOR

BACKGROUND OF THE INVENTION

1. Field of the Invention

The present invention relates to a CDMA (Code Division Multiple Access) receiving apparatus for a mobile communication system, particularly for a car phone/portable phone system (cellular system), and a reception method therefor.

2. Description of the Related Art

The CDMA reception method has an advantage that the same frequency is usable between all cells and within a cell, and a path diversity effect of composing plural arrival path signals can be obtained by a simple RAKE receiver. However, it has a problem that the interference between channels cannot be perfectly extinguished. In order to solve this problem, Japanese Laid-open Patent Application No. Hei-7-170242 has disclosed a method of removing interference by using an adaptive despreading filter.

FIG. 4 shows the construction of the conventional CDMA receiving apparatus disclosed in the above publication.

The conventional CDMA includes a reception antenna 101 for receiving a radio signal transmitted from a communication partner station (i.e., a station with which a station concerned communicates), a radio reception unit 102 for demodulating the radio signal received by the reception antenna 101 to convert the radio signal to a base band signal, an analog/digital converter (A/D) 103 for converting the base band signal to a digital signal and outputting it as a reception signal, a data accumulator 104 for accumulating the reception signal converted by the analog/digital converter 103, a channel signal processor 105 and a clock generator 106 for transferring a clock signal clk to each block of the channel signal processor 105.

In each block of the channel signal processor 105, a signal having a twice period of the chip rate serving as a reference time unit of the frequency spreading processing is formed by using the clock signal clk, and each block operates on the basis of the signal thus formed.

Further, the channel signal processor 105 comprises an adaptive despreading filter 110, an adaptive controller 111, a judgment unit 112 and an autocorrelative inverse matrix calculator 113.

The adaptive despreading filter 110 comprises a transversal filter, and it applies filtering processing to the reception signal r by performing despreading with a variable coefficient vector a.

The adaptive controller 111 renews the variable coefficient vector a so that the error power between the output signal re and the judgment data rd is minimum.

The judgment unit 112 makes a judgment on the output signal re of the adaptive despreading filter 110 so that the output signal re is set to the data of a transmission series of a transmitter which transmits the radio signal, and outputs the judgment result as the judgment data rd. That is, the judgment data rd is the data obtained by removing noises from the output signal data re.

The autocorrelative inverse matrix calculator 113 calculates the inverse matrix of an autocorrelative matrix of the reception signal re, and transfers the inverse matrix thus calculated to the adaptive controller 111.

FIG. 5 is a block diagram showing the adaptive despreading filter 110. The adaptive despreading filter 110 comprises sampling circuits 201, 205, a shift register 202, a variable coefficient multiplier 203 and an adder 204.

The sampling circuit 201 samples the reception signal r at the twice period of the chip rate, and outputs it to the shift register 202.

The shift register 202 successively stores the reception signal r sampled by the sampling circuit 201 to generate and output a tap output vector u.

The variable coefficient multiplier 203 multiplies the tap output vector u and the variable coefficient vector a with each other.

The adder 204 adds the multiplication results of the variable coefficient multiplier 203.

The sampling circuit 205 samples the addition value of the adder 204 at the period of a symbol rate, and outputs it as the output signal re.

Next, the operation of the conventional CDMA receiving apparatus thus constructed will be described hereunder.

First, the radio signal received by the reception antenna 101 is demodulated by the demodulator 102 to be converted to the base band signal, converted to the digital reception signal r in the analog/digital converter 103, and then accumulated in the data accumulator 104.

The reception signal r accumulated in the data accumulator 104 is sampled at the twice period of the chip rate in the sampling circuit 201, and then input to the shift register 202.

Representing the spreading rate of CDMA by M, for the shift register 202, the tap interval is equal to the half of the period of the chip rate, and the number of taps is equal to 6M.

In the autocorrelative inverse matrix calculator 113, the inverse matrix of the autocorrelative matrix of the reception signal r is calculated, and transferred to the adaptive controller 111. In the adaptive controller 111, the variable coefficient vector a={a0, a1, a2, ..., a6M−1} serving as a filter coefficient of the adaptive despreading filter 110 is generated by using the inverse matrix thus calculated.

Thereafter, in the adaptive despreading filter 110, the reception signal r is sampled by the sampling circuit 201, and successively stored in the shift register 202 to generate the tap output vector u={u0,u1,u2, ..., u6M−1} and output the tap output vector to the adaptive controller 111. Further, in the adaptive despreading filter 110, the tap output vector u is weighted with the variable coefficient vector a and added in the adder 204, then sampled at the period of the symbol rate in the sampling circuit 205, and then output as the output signal re. In the judgment unit 112, noises are removed from the output signal re, and the resultant signal is output as the judgment data rd.

Here, the adaptive controller 111 controls the variable coefficient vector a so that the error power between the output signal re and the judgment data rd is minimum. A known training signal is transmitted/received at a transmission side/reception side from the time just after reception of a burst signal is started until the variable coefficient vector a of the adaptive despreading filter 110 is converged. After the variable coefficient vector a is converged, correct data are output for the judgment data from the judgment unit 112, so that the variable coefficient vector a is successively judged so that the adaptive controller 111 minimizes the error power between the output signal re from the adaptive despreading filter 110 and the judgment data rd from the judgment unit 112, whereby the variation of the transmission path characteristics can be tracked. As an adaptive control algorithm for minimizing the error power have been known an LMS (Least Mean Square Algorithm) which is simple, but low in converging rate, an RLS algorithm which is high in converting rate, but complicate, etc.

Signal components (interference signals) addressed to other receivers and noises of the receiver cause errors in the self-receiving apparatus. Accordingly when power of interference signal noise power of receiver, the adaptive despreading filter 110 operates to cancel the interference signal.

In the conventional CDMA receiving apparatus, the composite path length, that is, the tap number of the adaptive despreading filter 110 is fixed to the maximum value in advance. Therefore, when a communication is made under a severe radio environment like a metropolitan region containing many buildings or the like in which multipath occur frequently because the radio transmission path status is bad, the multiple paths can be added without omission by composing many paths. Therefore, S/N is increased and an error rate is reduced, and thus this is extremely effective. However, for example when a communication is made under a radio environment like a clear suburb in which multipath occur rarely because the radio transmission path status is relatively good, the delay dispersion is smaller than a predetermined composite path length, and unneeded taps exist. Therefore, the adaptive despreading filter 110 operates these unneeded taps, and thus it performs unneeded calculation. Further, for the calculation in the adaptive controller 111 and the inverse matrix calculation in the autocorrelative inverse matrix calculator 113, unneeded calculations are carried out because of existence of unneeded taps.

In a portable telephone (cellular phone) system, it is a critical problem to reduce the power consumption of telephones owing to the recent miniaturization design of telephones, and the unneeded calculations promote extra power consumption.

Further, when the variable coefficient vector a corresponding to the unneeded tap is not zero, noises are unintentionally added, resulting in deterioration of S/N or increase of the error rate in some cases.

The above-described conventional CDMA receiving apparatus has the following problems.

(1) when a communication is made under such a radio environment that the radio transmission path state is relatively good and thus the multipath is less, unneeded taps exist, so that power is vainly wasted.

(2) When a communication is made under such a radio environment that the radio transmission path state is relatively good and the multipath is less, unneeded taps exist, so that noises are added to induce deterioration of S/N and increase of the error rate.

SUMMARY OF THE INVENTION

The present invention has an object to provide a CDMA receiving apparatus which can reduce calculation load to suppress power consumption and also enhance reception quality by operating an adaptive despreading filter by using only a needed number of taps.

In order to attain the above object, a CDMA receiving apparatus according to the present invention is characterized by comprising:

a reception antenna for receiving a radio signal transmitted from a communication partner station;

a radio reception unit for demodulating the radio signal received by the reception antenna to convert the radio signal to a base signal;

an analog/digital converter for converting the base band signal to a digital signal and outputting the digital signal as a reception signal;

an adaptive despreading filter for performing despreading with a variable coefficient vector to subject the reception signal to filtering processing;

an adaptive controller for renewing the variable coefficient vector so that the error power between the output signal of the adaptive despreading filter and the judgment data is minimum;

a judgment unit for making a judgment so the output signal from the adaptive despreading filter is data of a transmission series of a transmitter transmitting the radio signal, and outputting the judgment result as the judgment data;

an autocorrelative inverse matrix calculator for calculating the inverse matrix of an autocorrelative matrix of the reception signal and transferring the inverse matrix thus calculated to the adaptive controller;

a profile calculator for calculating profile data comprising the level of a signal by despreading the reception signal with a timely-shifted spread code, and the timely-shifted amount of the spread code; and a tap controller for determining the needed tap length and the timing from the profile data.

According to the present invention, the profile data of the reception signal are created in the profile calculator, and the number of needed taps and the timing are determined by using the profile data in the tap controller, whereby the calculation for only needed number of taps are performed in the adaptive controller and the autocorrelative inverse matrix calculator and no calculation is performed for unneeded taps in the adaptive despreading filter.

Accordingly, the calculation load is reduced and thus the power consumption is reduced, so that any noise due to unneeded taps does not occur, thereby enhancing the reception quality.

BRIEF DESCRIPTION OF THE DRAWINGS

FIG. 2 is a diagram showing the construction of a profile calculator 107 in FIG. 1;

FIG. 3 is a diagram showing a specific example of profile data

DETAILED DESCRIPTION OF THE PREFERRED EMBODIMENT

A preferred embodiment according to the present invention will be described with reference to the accompanying drawings.

Figure 1:
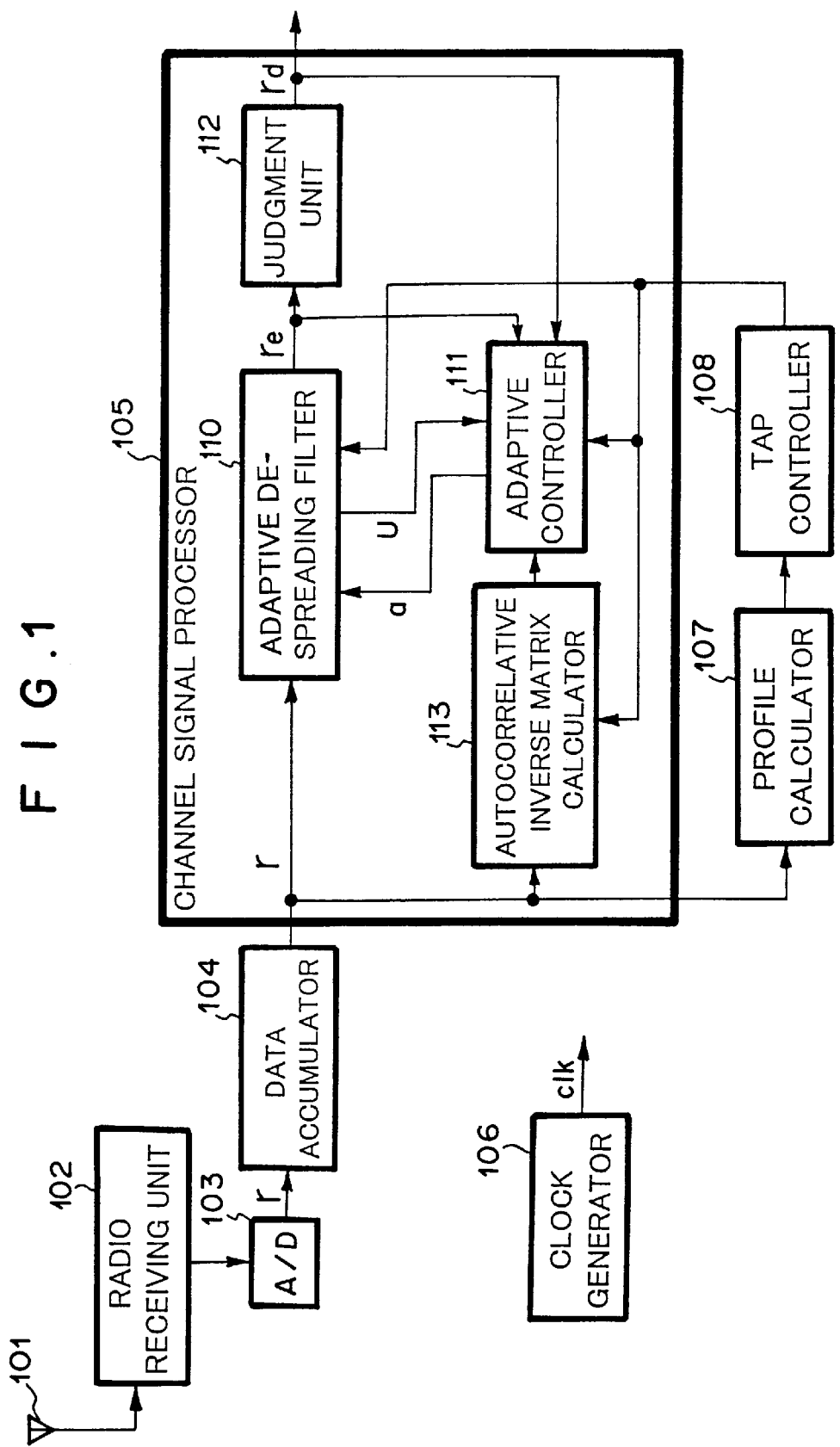
FIG. 1 is a block diagram showing the construction of a CDMA receiving apparatus according to an embodiment of the present invention.
Figure 4:
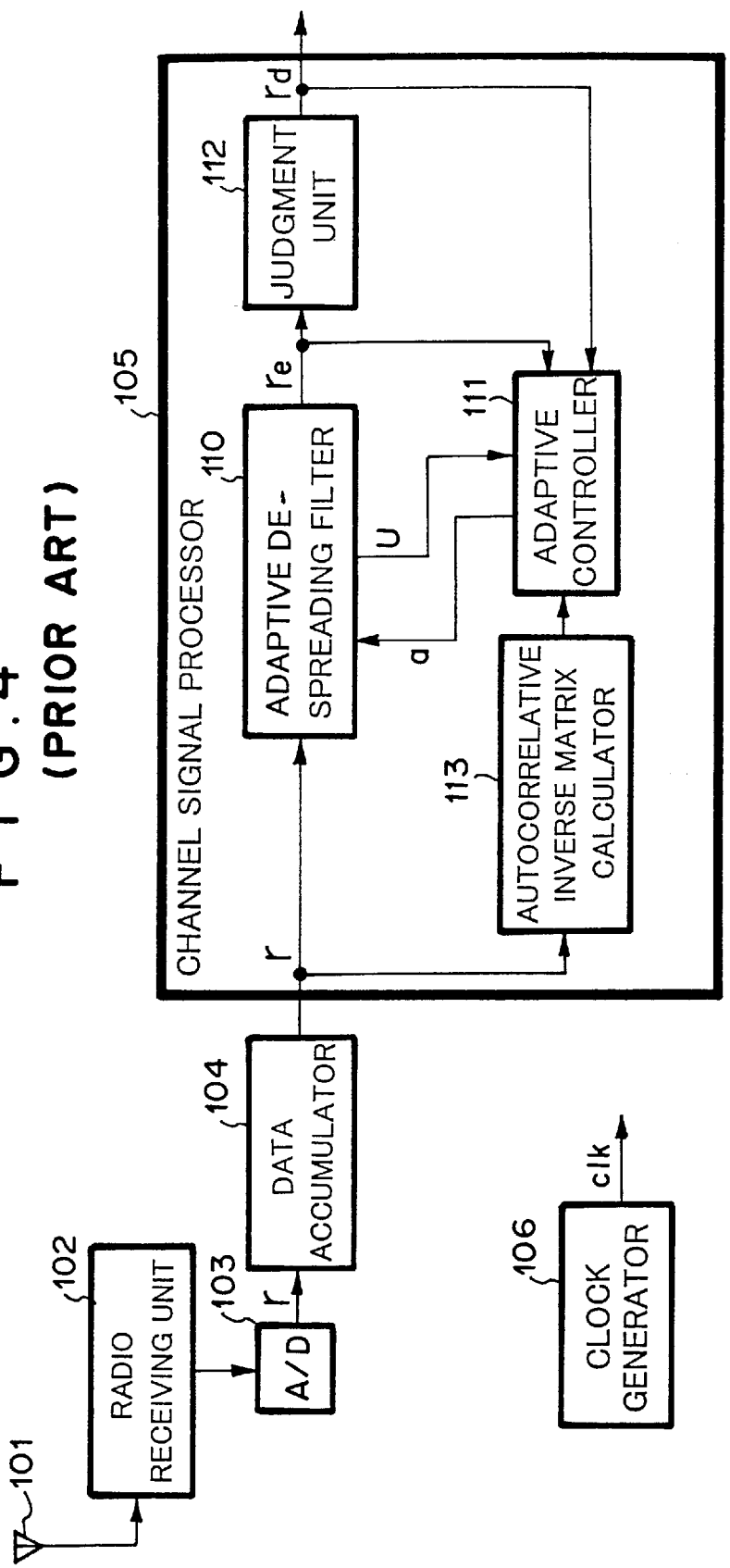
FIG. 4 is a block diagram showing the construction of a conventional CDMA receiving apparatus.
Figure 5:
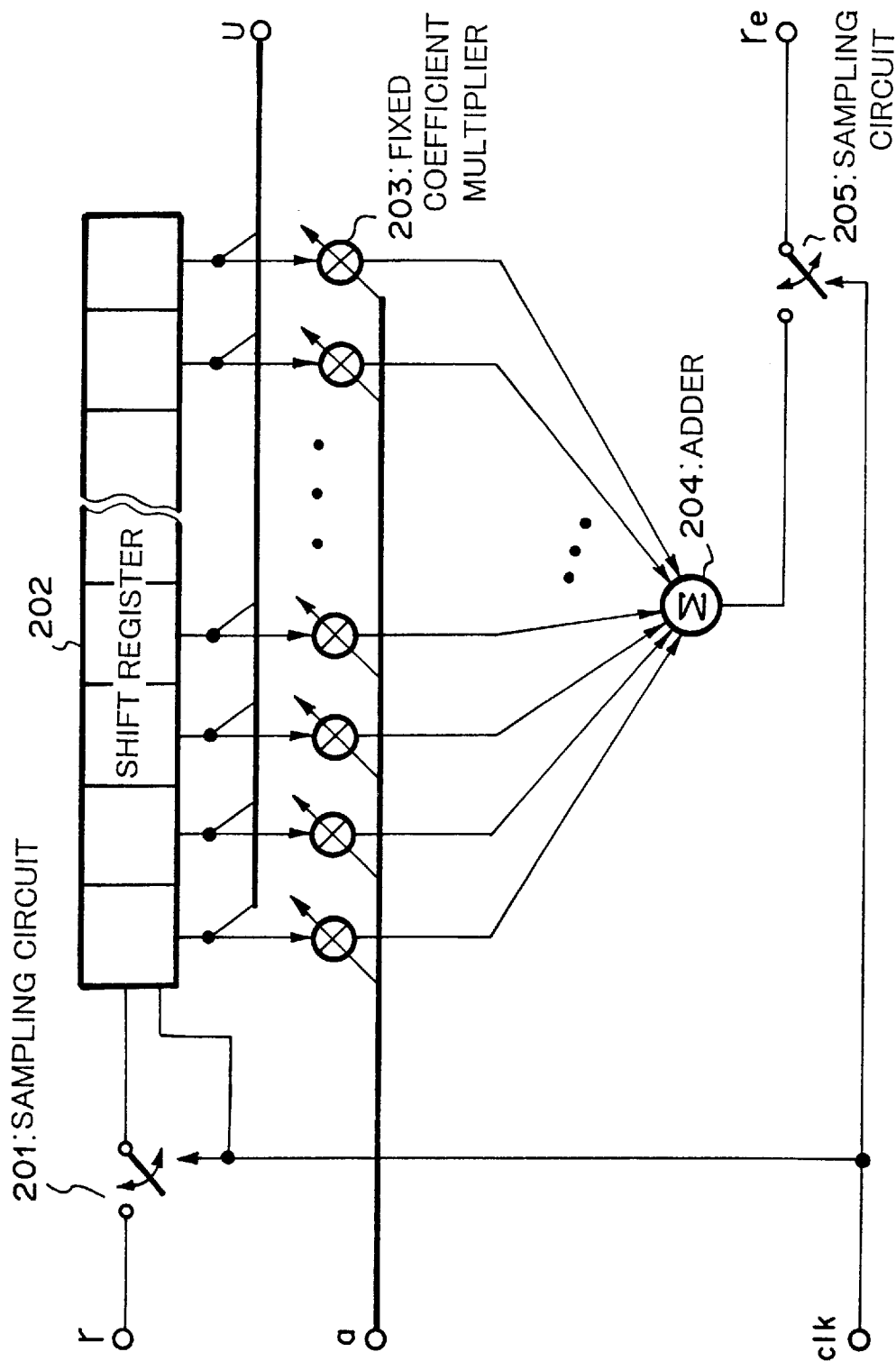
FIG. 5 is a block diagram showing the construction of an adaptive despreading filter 110 in FIG. 4.

FIG. 1 is a block diagram showing the construction of a CDMA receiving apparatus according to an embodiment of the present invention, and the same reference numerals as those of FIG. 4 represent the same elements.

In the CDMA receiving apparatus of this embodiment, the conventional CDMA receiving apparatus shown in FIG. 4 is provided with a profile calculator 107 for calculating profile data comprising plural respective signal levels and time-positions contained in each reception signal r, a tap controller 108 for determining the needed tap length and the timing from the profile data.

FIG. 2 is a block diagram showing the construction of the profile calculator 107 of the present invention.

The profile calculator 107 comprises sampling circuits 301, a shift register 302, a fixed coefficient multiplier 303, an adder 304 and a level calculator 306.

The sampling circuit 301 samples the reception signal r at the twice period of the chip rate, and outputs the sampled signal to the shift register 302. The shift register 302 successively stores the reception signals r sampled by the sampling circuit 301. The fixed coefficient multiplier 303 multiplies the fixed coefficient vector c and each of the reception signals r which are successively stored in the shift register 302. The adder 304 adds the multiplication results of the fixed coefficient multiplier 303. The sampling circuit 305 samples and outputs the addition value of the adder 304 at the twice period of the chip rate.

The level calculator 306 squares the data sampled by the sampling circuit 305 to generate and output profile data P.

Next, the operation of this embodiment will be described with reference to the accompanying drawings.

The operation until the reception signal r is accumulated in the data accumulator 104 is the same as the conventional CDMA receiving apparatus.

According to this embodiment, in the profile calculator 107, the reception signal r is sampled at the twice period of the period of the chip rate in the sampling circuit 301, and input to the shift register. The tap length of the shift register 302 is fixed, and this tap length is represented by L. The fixed coefficient vector $c=[c0, c1, c2, \ldots, cL-1]$ of the profile calculator 107 is uniquely determined from the transmission series code and the spread code.

The reception signals r which are successively stored into the shift register 302 are weighted with the fixed coefficient vector c and added, then sampled at the twice period of the chip rate in the sampling circuit 305, and then squared in the level calculator 306, thereby obtaining the profile data P. That is, the data obtained by multiplying the fixed coefficient vector c and the reception signal r, adding the multiplication results and then squaring the addition result is obtained every ½ period of the chip rate. Accordingly, the profile data P contain the information on the level of the signal obtained by performing despreading on the reception signal r with timely-shifted spread code and the timely-shifted amount of the spread code.

In the tap controller 108, the needed tap number and the timing are determined from the magnitude of the level of the profile data P and its time position. Specifically, some of profile data P are successively selected in the order to the magnitude of the level, and the tap number and the timing are determined so as to contain the profile data P thus selected. In the adaptive controller 111, the variable coefficient vector a of the adaptive despreading filter 110 is calculated by using the tap number and the timing thus determined.

In the adaptive despreading filter 110, the reception signal r is subjected to adaptive despreading with the variable coefficient vector a, and then output as the output signal re. The operation thereof will be described hereunder.

In the adaptive despreading filter 110, the reception signal r is sampled at the twice period of the chip rate in the sampling circuit 301, and input to the shift register 302. When the tap number supplied from the tap controller 108 is equal to N, the adaptive controller 111 supplies the variable coefficient vector $a=[a0, a1, a2, \ldots, aN-1]$ to the adaptive despreading filter 110. The tap output vector $u=[u0,$ $u1, u2, \ldots, uN-1]$ is weighted with the filter coefficient vector a and added, and sampled at the period of the symbol rate in the sampling circuit 305, and then output as the output signal re of the adaptive despreading filter 110.

Subsequently, the adaptive controller 111 controls the filter coefficient a to track the variation of the transmission path characteristic in the same manner as the conventional CDMA receiving apparatus as described above.

Next, a specific example of the profile data P is shown in FIG. 3.

FIG. 3A shows a case where multipath having a relatively long delay time exists. When the spread of the profile is larger than the preset maximum tap number as described above, the tap length is set to the maximum tap number, and the timing is set so that the portion having the maximum level is set to the center or the sum of levels within the tap length is maximum.

However, when there exists no multipath having a relatively long delay time and thus the spread of the profile is smaller than the preset maximum tap number as shown in FIG. 3B, the needed tap number may be set to Nb. Here, Nb is a value obtained by adding Ns to the number of taps from the first peak until the last peak in the profile. Ns is determined by the number of chips per one symbol, that is, the spreading rate, and its value is twice as large as the spreading rate. FIG. 3B shows a case where the spreading rate is equal to 4.

When the spread of the profile is smaller than the preset maximum tap number as described above, it is unnecessary to operate all the taps, and thus the calculation load of the adaptive despreading filter 110 is reduced, and also the filter coefficient calculation load in the adaptive controller 111 and the calculation load of the inverse matrix calculation in the autocorrelative inverse matrix calculator 113 are reduced. Further, the time to be needed until the tap coefficient vector a converges is also reduced, and thus the transmission/reception time of the training signal is reduced, so that the data transmission efficiency is enhanced.

Actually, it is preferable that the tap length may be slightly extended forwardly or backwardly in consideration of the effect of the transmission/reception filter, etc.

As described above, according to the CDMA receiving apparatus of the present invention, the calculation load can be reduced by determining the tap number of the adaptive despreading filter on the basis of the profile data, so that the power consumption of the adaptive controller can be reduced.

What is claimed is:

1. A CDMA receiving apparatus is characterized by comprising:

a reception antenna for receiving a radio signal transmitted from a communication partner station;

a radio reception unit for demodulating the radio signal received by said reception antenna to convert the radio signal to a base band signal;

an analog/digital converter for converting the base band signal to a digital signal and outputting the digital signal as a reception signal;

an adaptive despreading filter for performing despreading with a variable coefficient vector to subject the reception signal to filtering processing;

an adaptive controller for renewing the variable coefficient vector so that the error power between the output signal of said adaptive despreading filter and a judgment data of the renewing data is minimum;

a judgment unit for making a judgment so the output signal from said adaptive despreading filter is data of a transmission series of a transmitter transmitting the radio signal, and outputting the judgment result as the judgment data;

an autocorrelative inverse matrix calculator for calculating the inverse matrix of an autocorrelative matrix of the reception signal and transferring the inverse matrix thus calculated to said adaptive controller;

a profile calculator for calculating profile data comprising the level of a signal by despreading the reception signal with a timely-shifted spread code, and the timely-shifted amount of the spread code; and a tap controller for determining needed tap length and timing from the profile data.

2. The CDMA receiving apparatus as claimed in claim 1, wherein said profile calculator includes:

a first sampling circuit for sampling and outputting the reception signal at the twice period of a chip rate serving as a reference time unit for spreading;

a shift register for successively storing the reception signal which is sampled by the first sampling circuit;

a fixed coefficient multiplier for multiplying the reception signal successively stored in said shift register and a fixed coefficient vector determined by a transmission series code and a spreading code;

an adder for adding multiplication values of said fixed coefficient multiplier;

a second sampling circuit for sampling and outputting the addition value of said adder at the twice period of the chip rate; and a level calculator for squaring the data sampled by said second sampling circuit to generate and output the profile data.

3. The CDMA receiving apparatus as claimed in claim 1, wherein said adaptive despreading filter includes:

a first sampling circuit for sampling and outputting the reception signal at the twice period of a chip rate serving as a reference time unit for spreading;

a shift register for successively storing the reception signal sampled by said first sampling circuit to generate and output a tap output vector;

a variable coefficient multiplier for multiplying the tap output vector and the variable coefficient vector;

an adder for adding the multiplication values of said variable coefficient multiplier; and a second sampling circuit for sampling the addition value of said adder at the period of a symbol rate and outputting the sample result as the output signal.

4. The CDMA receiving apparatus as claimed in claim 2, wherein said adaptive despreading filter includes:

a first sampling circuit for sampling and outputting the reception signal at the twice period of a chip rate serving as a reference time unit for spreading;

a shift register for successively storing the reception signal sampled by said first sampling circuit to generate and output a tap output vector;

a variable coefficient multiplier for multiplying the tap output vector and the variable coefficient vector;

an adder for adding the multiplication values of said variable coefficient multiplier; and a second sampling circuit for sampling the addition value of said adder at the period of a symbol rate and outputting the sample result as the output signal.

5. A CDMA reception method comprising the steps of:

demodulating a radio signal transmitted from a communication partner station after receiving the radio signal, thereby converting the radio signal to a base band signal, and then converting the base band signal to a digital signal, thereby obtaining a reception signal;

performing despreading with a variable coefficient vector to subject the reception signal to filtering processing, thereby obtaining output data;

renewing the variable coefficient vector so that the error power between the output signal and judgment data is minimum;

making a judgment so that the output signal is transmission series data of a transmitter which transmits the radio signal, thereby obtaining the judgment data;

calculating the inverse matrix of an autocorrelative matrix of the reception signal;

calculating profile data containing the level of a signal obtained by despreading the reception signal with a timely-shifted spreading code, and the timely-shifted amount of the spreading code; and determining needed tap length and timing from the profile data.

6. The CDMA reception method as claimed in claim 5, wherein said profile data calculation step comprising the steps of:

sampling the reception signal at the twice period of a chip rate serving as a reference time unit for spreading and successively storing the sampled reception signal;

multiplying the reception signal successively stored and a fixed coefficient vector determined from a transmission series code and a spreading code and then added; and sampling the addition value at the twice period of the chip rate and squaring the sampling result to generate the profile data.

7. The CDMA reception method as claimed in claim 5, wherein said step of performing the despreading on the reception signal comprises the steps of:

sampling the reception signal at the twice period of a chip rate serving as a reference time unit for spreading and successively storing the sampled signal to obtain a tap output vector;

multiplying the tap output vector and the variable coefficient vector and adding the multiplication results; and sampling the addition value at the period of a symbol rate to obtain the output signal.

8. The CDMA reception method as claimed in claim 6, wherein said step of performing the despreading on the reception signal comprises the steps of:

sampling the reception signal at the twice period of a chip rate serving as a reference time unit for spreading and successively storing the sampled signal to obtain a tap output vector;

multiplying the tap output vector and the variable coefficient vector and adding the multiplication results; and sampling the addition value at the period of a symbol rate to obtain the output signal.

9. The CDMA reception method as claimed in claim 5, wherein when there exists no multipath having a relatively long delay time and thus the spread of the profile is smaller than the preset maximum tap number, the needed tap number is set to Nb by said determining step, whereas Nb is a value obtained by adding Ns to the number of taps from the first peak until the last peak in the profile and Ns is determined by the number of chips per one symbol.

* * * * *